United States Patent [19]
Verderber

[11] 3,855,828
[45] Dec. 24, 1974

[54] COMBINATION FUEL LINE AND IGNITION LOCK FOR MOTOR VEHICLES

[76] Inventor: Jerome Verderber, 192-10 35th Ave., Flushing, N.Y. 11358

[22] Filed: Sept. 17, 1973

[21] Appl. No.: 397,644

[52] U.S. Cl................ 70/243, 137/384.2, 200/44, 200/61.86
[51] Int. Cl. ........................................ B60r 25/04
[58] Field of Search .................. 70/243; 123/198 B; 200/42 R, 44, 61.86

[56] References Cited
UNITED STATES PATENTS

| 1,205,051 | 11/1916 | Soulliere | 340/64 |
| 1,230,108 | 6/1917 | Burkhardt | 200/42 |
| 1,746,432 | 2/1930 | Leiva | 70/243 |

Primary Examiner—Albert G. Craig, Jr.
Attorney, Agent, or Firm—Jacob L. Kolin

[57] ABSTRACT

A combination fuel lock and simultaneously operating ignition switch. The lock comprises a housing and a lock cylinder turnable in the housing. The cylinder is provided with a pair of spaced insulating elements and a through cross-bore. A pair of insulated contacts in the housing are connected in series with the vehicle's ignition switch and are biased against the cylinder. The housing is provided with inlet and outlet passages alignable with the cylinder's cross-bore.

4 Claims, 7 Drawing Figures

PATENTED DEC 24 1974 3,855,828
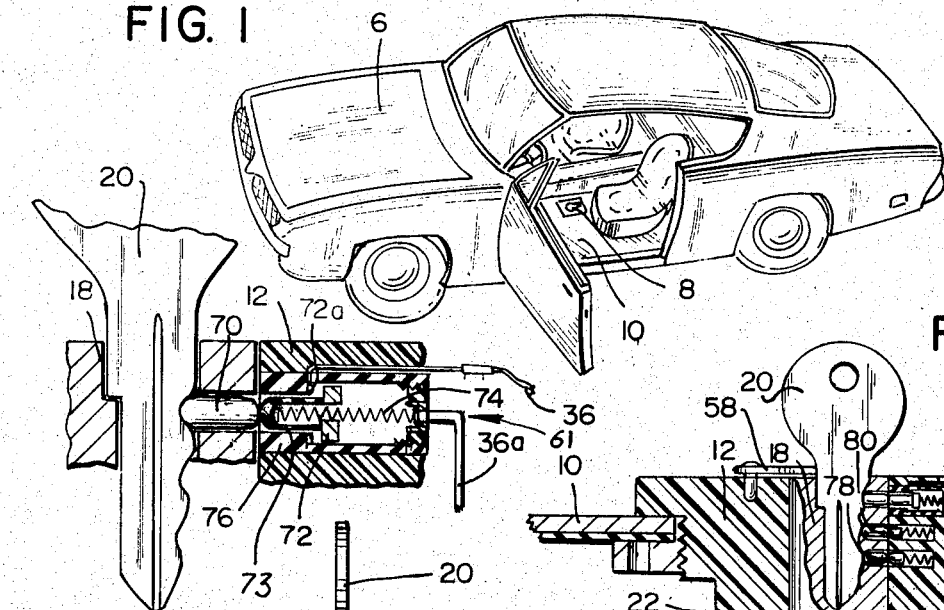
FIG. 1
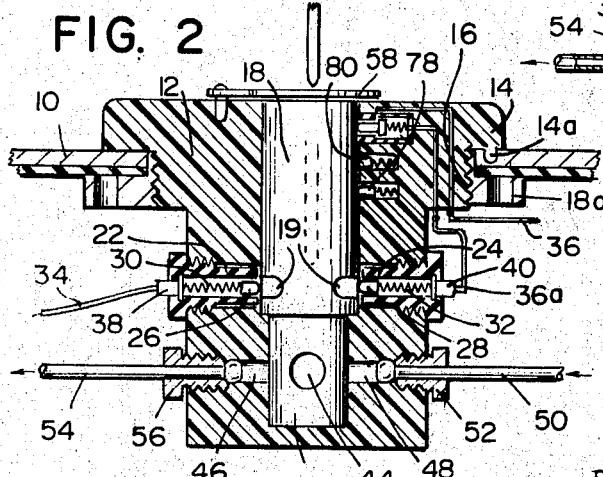
FIG. 7
FIG. 2
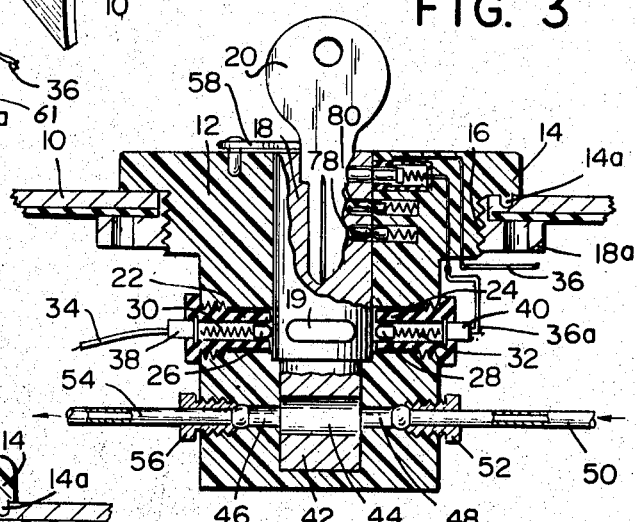
FIG. 3
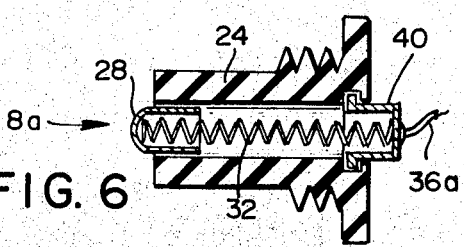
FIG. 6
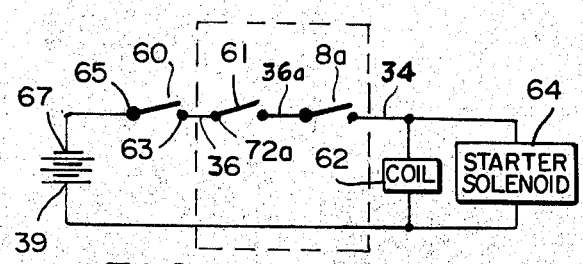
FIG. 5
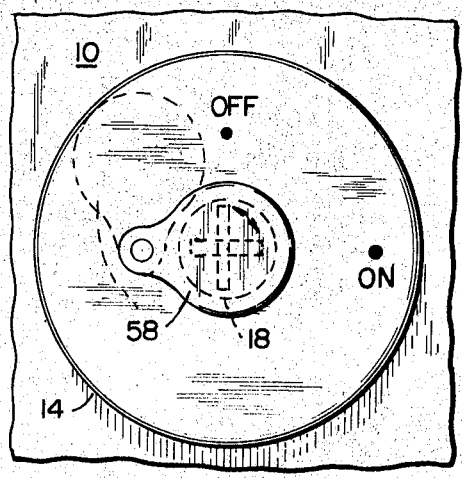
FIG. 4

COMBINATION FUEL LINE AND IGNITION LOCK FOR MOTOR VEHICLES

The invention relates to locks in general and in particular to an anti-theft lock for motor vehicles powered by internal combustion engines.

An important object of the invention is to provide an auxilliary lock for such vehicles which will simultaneously shut off the ignition current and fuel supply thereby preventing a thief from moving the vehicle any distance after entering the vehicle.

A further object of the invention is to provide a device of the above character which can be mounted unobtrusively in a not easily accessible part of the vehicle, such as the vehicle's floor, bulkhead and the like, thereby delaying and making it difficult to start the vehicle, thus discouraging efforts to steal it.

Yet another object of the invention is to provide a device of the above character which is simple in construction and operation and is easy to install.

These and other objects of the invention will become apparent from the following description and accompanying drawing. It should be understood, however, that various changes in detail construction, size or parts may be made within the scope of the invention.

In the drawings:

FIG. 1 is a general view of a motor vehicle employing the inventive device;

FIG. 2 is a cross-section of the device in locked position;

FIG. 3 is a cross-section of the device in unlocked position;

FIG. 4 is a top plan view of the device;

FIG. 5 illustrates the electrical circuit of the device;

FIG. 6 is an enlarged detail of one switch and

FIG. 7 is an enlarged detail of the control switch of the device.

Referring now to the drawing in detail, the motor vehicle 6 has the anti-theft device 8 mounted in its floor 10. The anti-theft device comprises a solid housing 12 of molded nylon or the like formed at its upper end with a flange 14, an alignment pin 14a and a threaded portion 16. The housing can thus be secured to the motor vehicle's floor 10 by providing a suitable opening in the floor, inserting the housing therethrough, fixing flange 14 by means of alignment pin 14a and screwing on and tightening spanner nut 18a.

Mounted axially in the housing is a metal lock cylinder 18, operable by a key 20. The lock is of a type in which the spring-biased tumblers are mounted in the housing proper and are moved out of the cylinder's path by inserting the key 20 and turning the cylinder as shown in FIG. 3. The lock cylinder is provided on its periphery with a pair of non-conductive inserts 19. Mounted in the housing is a switch 8a comprising a pair of identical non-conductive bushings 22, 24 containing contacts 26, 28 biased by springs 30, 32, respectively, against the cylinder 18. One of said pair of bushings, contacts and spring is shown in enlarged detail in FIG. 6. Switch 8a is indicated diagramatically in FIG. 5. Terminal 38 of the switch is connected to one side of an ignition coil and starter solenoid, the other side of these being directly connected to the battery terminal 39, as shown in FIG. 5.

There is further provided in the housing a control switch 61, shown in enlarged detail in FIG. 7. The control switch comprises a non-conductive bushing 76 in which is mounted a ring shaped contact 72a, connected by wire 36 to terminal 63 of an usual ignition switch 60, the other terminal 65 of which is connected to battery terminal 67. A movable contact 72 is secured to a closed end non-conductive bushing 73 biased by a spring 74. When the key 20 has been inserted in the cylinder 18, as shown in FIG. 3, the end of the key pushes the tumbler 70 inwardly of the housing a sufficient distance against the bias of spring 74, to separate contact 72 from contact 72a, thus opening the switch 61. Switch 61 must be closed by removing key 20, thus allowing spring 74 to press contact 72 against contact 72a.

Movable contact 72 is connected, through spring 74, wire 36a and spring 32, with contact 28 of switch 8a.

The key for the anti-theft device should be different from the regular ignition switch key.

The lock cylinder 18 is further formed at its lower end with an extension 42 having a bore 44, alignable with threaded inlet and outlet bored passages 46, 48. The bore 44 is alignable with these passages by turning the lock cylinder to the position shown in FIG. 3. A tubing 50 from the vehicle's fuel tank (not shown) is secured by means of a compression or similar fitting 52 to the inlet passage 48, while a tubing 54 leading to a carburator (not shown), of the vehicle is secured by fitting 56 to the outlet passage 46. The key entrance to the lock is protected from entrance of dirt by a pivotable cover 58.

The electrical circuit for the device is illustrated in FIG. 5.

In use, after the lock has been mounted in the floor board or other suitable place of a vehicle, the gasoline lines and wiring attached as described above, and the regular ignition switch 60 is on, the key 20 of the device is inserted in the lock's cylinder and the latter is turned to the position shown in FIG. 3. This aligns the cylinder extension bore with the threaded passages in the extension, to permit the flow of fuel. Electrical contact is established between the contacts 26, 28 metal cylinder 18 and contact 72. Due, however, to the displacement of contact 72 away from contact 72a caused by the action of the end of the inserted key 20 against the bias of spring 74, switch 61 will remain open; no current will flow through switch 8a or control switch 61.

In order to close the circuit illustrated in FIG. 5 and permit current to flow therethrough, the key 20 after it has been turned to the position shown in FIG. 3, must be withdrawn from the cylinder 18. This will permit spring 74 to press contact 72 against contact 72a thus closing the circuit illustrated in FIG. 5.

To lock the ignition and stop the flow of fuel from the fuel tank, the key 20 is reinserted and turned back to the position shown in FIGS. 2 and 4.

The current is thus interrupted by the non-conductive inserts 19, while the flow of fuel is stopped by the extension 42, as shown in said FIG. 2.

I claim:

1. An anti-theft device for an internal combustion engine of a motor vehicle comprising, in combination, lock means for simultaneously switching off an ignition circuit and shutting off a fuel supply for an engine, said lock means comprising a non-conductive lock housing, a lock cylinder rotatably displaceable in said housing, said cylinder being provided with a pair of spaced nonconductive inserts on its periphery and a lower end portion provided with a through bore, a pair of nonconductive bushings secured in said housing radially of said lock cylinder and alignable with said nonconductive inserts, contacts mounted in said bushings, springs in said bushings biasing said contacts against said cylinder, wire means for electrically connecting these elements in series with an ignition circuit of a motor vehicle; said housing having a pair of radially extending inlet and outlet passages alignable with said bore and tubing secured to said passages for connecting said inlet and outlet passages to a vehicle's fuel tank and a carburetor respectively.

2. The device as claimed in claim 1, wherein said upper end of the housing is formed with a radial flange and an adjacent outer threaded portion, and a lock nut engageable with said outer threaded portion for securing said housing to a mounting surface.

3. The device as claimed in claim 1, further provided with control switch means connected in series with said contacts, said control switch means being operable to open the circuit when a key is inserted in said cylinder and to close the circuit when a key is removed from said cylinder.

4. The device as claimed in claim 1, wherein said lock cylinder has a key opening and a switchable cover for said key opening, for preventing entrance of foreign matter therein.

* * * * *